US008026970B2

(12) United States Patent
Shibutani et al.

(10) Patent No.: US 8,026,970 B2
(45) Date of Patent: Sep. 27, 2011

(54) IMAGE REPRODUCTION APPARATUS CAPABLE OF SIMULTANEOUSLY REPRODUCING PLURALITY OF IMAGES

(75) Inventors: Atsushi Shibutani, Tokorozawa (JP); Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 955 days.

(21) Appl. No.: 10/772,742

(22) Filed: Feb. 4, 2004

(65) Prior Publication Data
US 2004/0169742 A1 Sep. 2, 2004

(30) Foreign Application Priority Data

Feb. 27, 2003 (JP) .................................. 2003-051276
Jun. 5, 2003 (JP) .................................. 2003-161104

(51) Int. Cl.
*H04N 5/222* (2006.01)
(52) U.S. Cl. ................. 348/333.05; 348/231.5
(58) Field of Classification Search ............... 348/231.2, 348/231.3, 231.5, 333.01, 333.02, 333.05; 386/38, 107; 715/723, 730, 732, 835, 838
See application file for complete search history.

(56) References Cited

U.S. PATENT DOCUMENTS

| 5,553,277 | A | * | 9/1996 | Hirano et al. ............... 707/104.1 |
| 5,796,428 | A | * | 8/1998 | Matsumoto et al. ........ 348/207.99 |
| 6,118,480 | A | * | 9/2000 | Anderson et al. ........... 348/207.99 |
| 6,186,553 | B1 | * | 2/2001 | Phillips et al. .................. 283/2 |
| 6,295,139 | B1 | | 9/2001 | Yamauchi et al. |
| 6,310,648 | B1 | * | 10/2001 | Miller et al. ............. 348/333.05 |
| 6,408,301 | B1 | * | 6/2002 | Patton et al. ................... 707/741 |
| 7,193,646 | B1 | | 3/2007 | Shioji |
| 7,325,198 | B2 | * | 1/2008 | Adcock et al. ................ 715/722 |
| 7,787,042 | B2 | * | 8/2010 | Nagata ....................... 348/333.11 |
| 2001/0050679 | A1 | | 12/2001 | Shigeta |
| 2002/0140820 | A1 | * | 10/2002 | Borden, IV .............. 348/207.99 |
| 2002/0191079 | A1 | | 12/2002 | Kobayashi et al. |
| 2003/0001949 | A1 | | 1/2003 | Obata et al. |
| 2003/0033296 | A1 | * | 2/2003 | Rothmuller et al. ............. 707/3 |
| 2004/0145602 | A1 | * | 7/2004 | Sun et al. ....................... 345/720 |

FOREIGN PATENT DOCUMENTS

| CN | 1258165 A | 6/2000 |
| JP | 05-128166 A | 5/1993 |
| JP | 10-136294 | 5/1998 |
| JP | 11-004400 A | 1/1999 |
| JP | 11-215457 | 8/1999 |

(Continued)

OTHER PUBLICATIONS

Japanese Office Action dated Jun. 24, 2008, issued in counterpart Japanese Application No. 2003-161104, and English translation thereof.

(Continued)

*Primary Examiner* — David Ometz
*Assistant Examiner* — Carramah J Quiett
(74) *Attorney, Agent, or Firm* — Holtz, Holtz, Goodman & Chick, P.C.

(57) ABSTRACT

An image reproduction apparatus includes a flash memory which adds recording time information to an image and records the image, and a control unit which classifies images in the memory on the basis of the added time information, limits the number of classified images for each date to one, and causes a display unit to display a calendar image as a list of images.

21 Claims, 8 Drawing Sheets

FOREIGN PATENT DOCUMENTS

| | | |
|---|---|---|
| JP | 11-341421 A | 12/1999 |
| JP | 2000-098510 A | 4/2000 |
| JP | 2000-196999 A | 7/2000 |
| JP | 2001-111965 A | 4/2001 |
| JP | 2001-119653 A | 4/2001 |
| JP | 2001-285779 A | 10/2001 |
| JP | 2002-112079 A | 4/2002 |
| JP | 2002-149682 A | 5/2002 |
| JP | 2002-152662 A | 5/2002 |
| JP | 2002-191014 A | 7/2002 |
| JP | 2003-125347 A | 4/2003 |
| KR | 2001-0105198 A | 11/2001 |

OTHER PUBLICATIONS

Japanese Office Action dated Feb. 9, 2010 and English translation thereof in counterpart Japanese Application No. 2007-192876.

Japanese Office Action dated Sep. 21, 2010 (and English translation thereof) in counterpart Japanese Application No. 2007-192876.

\* cited by examiner

IMAGE REPRODUCTION APPARATUS CAPABLE OF SIMULTANEOUSLY REPRODUCING PLURALITY OF IMAGES

CROSS-REFERENCE TO RELATED APPLICATIONS

This application is based upon and claims the benefit of priority from the prior Japanese Patent Applications No. 2003-051276, filed Feb. 27, 2003; and No. 2003-161104, filed Jun. 5, 2003, the entire contents of both of which are incorporated herein by reference.

BACKGROUND OF THE INVENTION

1. Field of the Invention

The present invention relates to an image reproduction apparatus and method which can be used for, e.g., a digital camera.

2. Description of the Related Art

Digital cameras capable of acquiring a photographed image as digital data are widely spreading and replacing cameras that use silver halide films.

For digital cameras of this type, a technique has been proposed in which, in a reproduction mode, a plurality of photographed image data recorded in a memory are displayed on the basis of the photographing day data on some date fields selected from date fields corresponding to a predetermined period (e.g., one month or one week) set on a calendar window.

BRIEF SUMMARY OF THE INVENTION

According to an aspect, an image reproduction apparatus comprises a memory which records photographed image data and photographing information of the photographed image data in association with each other, a display, a first display control unit which sets a predetermined number of display areas on the display, a display area selection unit which selects, on the basis of the photographing information recorded in the memory, a display area in which the photographed image data recorded in the memory in association with the photographing information should be displayed from the predetermined number of display areas set by the first display control unit, a second display control unit which displays the photographed image data in the display area selected by the display area selection unit, and a third display control unit which limits the number of photographed image data to be simultaneously displayed in the display area to a predetermined number.

According to another aspect, an image reproduction apparatus comprises a memory which records photographed image data, a display, a classification unit which classifies the photographed image data recorded in the memory into a plurality of groups in accordance with a predetermined condition, a first display control unit which displays, on the display for each group, the photographed image data classified by the classification unit, a second display control unit which limits the number of photographed image data to be displayed in each group to one, and a third display control unit which sequentially switches the photographed image data displayed in each group to display, on the display, a plurality of photographed image data included in the same group.

According to still another aspect, an image reproduction apparatus comprises a memory which records photographed image data, a display, a classification unit which classifies the photographed image data recorded in the memory into a plurality of groups in accordance with a predetermined condition, a display control unit which displays, on the display for each group, the photographed image data classified by the classification unit, a group designation unit which designates an arbitrary group of the plurality of groups displayed on the display by the display control unit, and an image processing unit which executes predetermined image processing at once for a plurality of photographed image data included in the group designated by the group designation unit.

According to still another aspect, an image reproduction apparatus comprises a memory which records photographed image data, a display, a classification unit which classifies the photographed image data recorded in the memory into a plurality of groups in accordance with a predetermined condition, a first display control unit which displays, on the display for each group, the photographed image data classified by the classification unit, and a second display control unit which limits a type of photographed image data to be displayed for each group on the display by the first display control unit.

According to still another aspect, an image reproduction apparatus comprises a memory which records photographed image data, a display, a classification unit which classifies the photographed image data recorded in the memory into a plurality of groups in accordance with a predetermined condition, a display control unit which displays, on the display for each group as a list, the photographed image data classified by the classification unit, and an image file generation unit which generates one image file data by using the image data for the list display, which is displayed on the display by the display control unit.

According to still another aspect, there is provided an image reproduction method comprising steps of setting a predetermined number of display areas on a display window of a display, selecting, on the basis of photographing information recorded in a memory, a display area in which photographed image data recorded in the memory in association with the photographing information should be displayed from the predetermined number of display areas, displaying the photographed image data in the selected display area, and limiting the number of photographed image data to be simultaneously displayed in the display area to a predetermined number.

According to still another aspect, there is provided a program which causes a computer of an image reproduction apparatus to execute processing for setting a predetermined number of display areas on a display window of a display, processing for selecting, on the basis of photographing information recorded in a memory, a display area in which photographed image data recorded in the memory in association with the photographing information should be displayed from the predetermined number of display areas, processing for displaying the photographed image data in the selected display area, and processing for limiting the number of photographed image data to be simultaneously displayed in the display area to a predetermined number.

DETAILED DESCRIPTION OF THE INVENTION

First Embodiment

The first embodiment in which the present invention is applied to a digital still camera will be described below with reference to the accompanying drawing.

Figure 1:
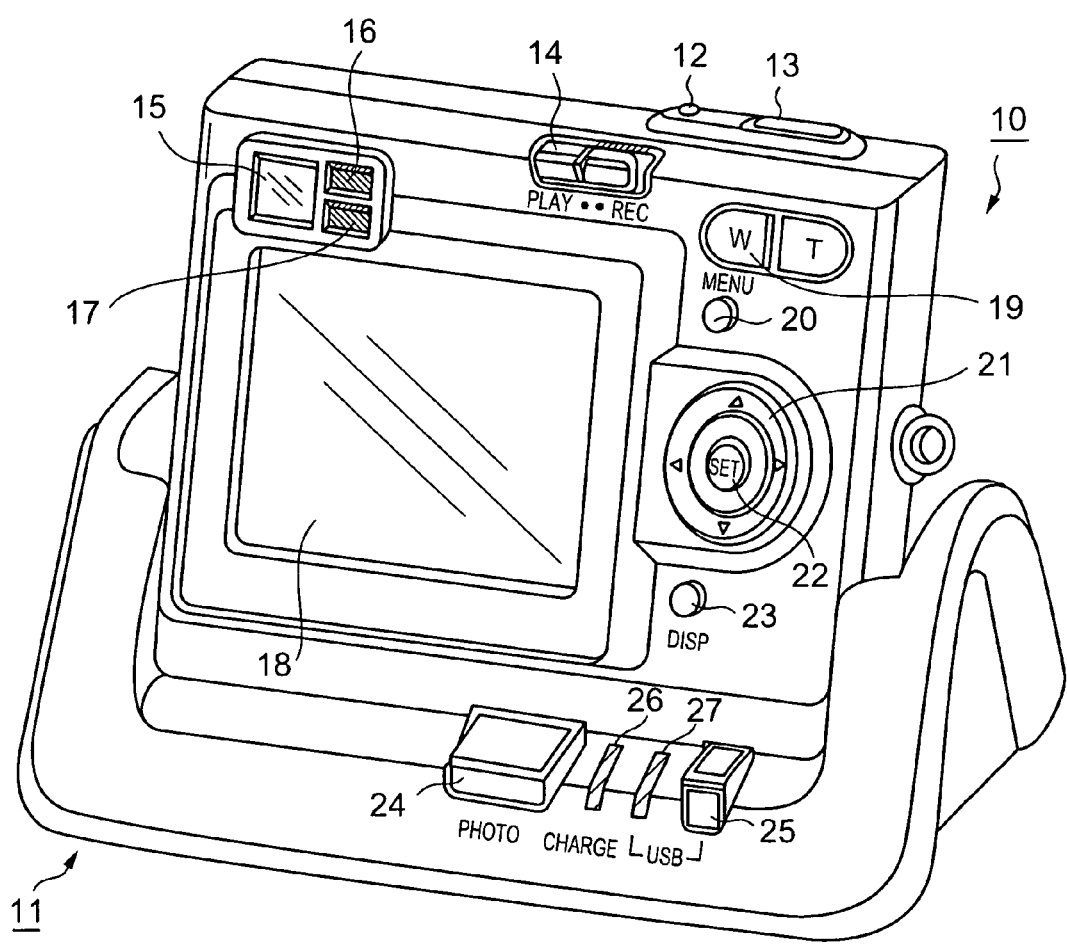
FIG. 1 is a perspective view showing the outer appearance of a digital camera according to the first embodiment of the present invention, which is placed on a cradle also serving as a charger.

FIG. 1 shows the outer appearance of a digital still camera 10 according to the first embodiment of the present invention, which is placed on a cradle 11 also serving as a charger. When the digital still camera 10 is placed on the cradle 11 while making the rear surface facing the front side, the internal battery can be charged. In addition, when the cradle 11 is connected to, e.g., a personal computer through a USB (Universal Serial Bus) cable (not shown), image data can be transmitted/received.

The digital still camera 10 is formed from a housing having a metal case with a size of, e.g., a cigarette package. A power key 12 and shutter key 13 are arranged on the upper surface.

The rear surface of the digital still camera 10 has a mode key 14, optical viewfinder 15, focus indicator 16, electronic flash indicator 17, display unit 18, zoom key 19, menu (MENU) key 20, ring key 21, set (SET) key 22, and display (DISP) key 23.

The power key 12 powers on/off the digital still camera 10.

When the shutter key 13 is operated in a photographing mode, image photographing is executed.

The mode key 14 is a key switch which switches between a photographing mode (REC) and a reproduction mode (PLAY) as basic modes by a sliding operation. Referring to FIG. 1, the mode key 14 is set on the reproduction mode side.

The optical viewfinder 15 is used to optically visually recognize the field of an object image.

The focus indicator 16 is arranged near the optical viewfinder 15 to indicate by turning on, e.g., a red LED that a focus lock state is set when the user is looking at an object through the optical viewfinder 15.

The electronic flash indicator 17 is arranged near the optical viewfinder 15 to indicate by turning on, e.g., a green LED that the charging of the electronic flash is ended when the user is looking at an object through the optical viewfinder 15.

The display unit 18 is constituted by a color TFT liquid crystal panel with a backlight, which has a diagonal size of, e.g., about 2 inches. In the photographing mode, an image to be photographed at that time is displayed on the monitor. In the reproduction mode, an image is displayed, which is selectively read out from a flash memory (to be described later) serving as a recording medium of the digital still camera 10. Alternatively, calendar display is done when the digital still camera is placed on the cradle 11.

The zoom key 19 changes the focal length of the photographing lens to the telephoto (T) side or wide-angle (W) side without steps in the photographing mode.

The menu key 20 displays various mode settings as menu items on the display unit 18.

The ring key 21 changes items displayed on the display unit 18 in the vertical and horizontal directions in accordance with the operation position of the ring-shaped operation key. A selected menu item is selectively set by the set (SET) key 22 located at the center of the ring key 21.

The display (DISP) key 23 switches ON/OFF of display on the display unit 18 and also switches the display form on the display unit 18.

As shown in FIG. 1, the cradle 11 has a "PHOTO" key 24, USB key 25, charge (CHARGE) indicator 26, and USB indicator 27. Although not illustrated, the cradle 11 also has a USB connector terminal at the placing position of the digital still camera 10.

When the digital still camera 10 is placed on the cradle 11, and the AC cable of the cradle 11 is connected to the wall outlet in home, the rechargeable battery in the digital still camera 10 can be charged. During charging, the charge indicator 26 is turned on.

When the "PHOTO" key 24 is operated, image data recorded in the digital still camera 10 is displayed on the display unit 18 so that the digital still camera 10 and cradle 11 can be used as an electronic photo frame.

In addition, when the cradle 11 on which the digital still camera 10 is placed is connected to an information device such as a personal computer (not shown) through a USB cable, and the USB key 25 is operated, image data can easily be transferred between the digital still camera 10 and the information device. During image data transfer, the USB indicator 27 is kept on.

The circuit arrangement in the digital still camera 10 will be described next with reference to FIG. 2.

The in-focus position or stop position of a lens optical system 32 including a photographing lens is moved by driving a motor (M) 31. In a monitoring state in the photographing mode, a CCD 33 serving as an image sensing element arranged on the rear side of the photographing optical axis of the lens optical system 32 is scanned and driven by a timing generator (TG) 34 and vertical driver 35. The CCD 33 outputs one frame of a photoelectric conversion output corresponding to an optical image formed at a predetermined period.

The photoelectric conversion output in a state of a signal having an analog value is appropriately gain-adjusted for each primary color component of RGB. The signal is sampled and held by a sample-and-hold (S/H) circuit 36 and converted into digital data by an A/D converter 37. Color processes including pixel interpolation processing and γ correction processing are executed by a color process circuit 38. Accordingly, a luminance signal Y and color difference signals Cb and Cr, which have digital values, are generated and output to a DMA (Direct Memory Access) controller 39.

The DMA controller 39 temporarily writes the luminance signal Y and color difference signals Cb and Cr output from the color process circuit 38 in the internal buffer of the DMA controller 39 by using a composite sync signal, memory write enable signal, and clock signal which are also output from the color process circuit 38. Then, the DMA controller 39 DMA-transfers, through a DRAM (I/F) interface 40, the signals Y, Cb, and Cr to a DRAM 41 used as a buffer memory.

A control unit 42 is constituted by a CPU, a ROM which permanently stores an operation program to be executed by the CPU, including calendar display processing (to be described later), and a RAM which is used as a work memory.

The control unit 42 controls the entire digital still camera 10. When DMA transfer of the luminance and color difference signals to the DRAM 41 is ended, the luminance and color difference signals are read out from the DRAM 41 through the DRAM interface 40 and written in a VRAM 44 through a VRAM controller 43.

A digital video encoder 45 periodically reads out the luminance and color difference signals from the VRAM 44 through the VRAM controller 43. On the basis of these data, the digital video encoder 45 generates a video signal and outputs it to the display unit 18.

The display unit 18 functions as a monitor display section (electronic viewfinder) in the photographing mode, as described above. The display unit 18 executes display on the basis of the video signal from the digital video encoder 45, thereby displaying in real time an image based on image information received from the VRAM controller 43 at that time.

An image at that time is displayed on the display unit 18 in real time. In this state, when the shutter key 13 that constitutes a key input unit 46 is operated at a timing for still image photographing, a trigger signal is generated.

In response to the trigger signal, the control unit 42 immediately stops the path from the CCD 33 to the DRAM 41 after the end of DMA transfer of the luminance and color difference signals of one frame that is received from the CCD 33 at that time so that a transition to a recording/storage state occurs.

In the recording/storage state, the control unit 42 reads out the luminance and color difference signals of one frame, which are written in the DRAM 41, through the DRAM interface 40 in a unit called a basic block of 8×8 pixels for each component Y, Cb, and Cr and writes the signals in a JPEG (Joint Photograph coding Experts Group) circuit 47. The JPEG circuit 47 compresses the data by ADCT (Adaptive Discrete Cosine Transform) and Huffman coding as an entropy encoding method.

The resultant code data is read out from the JPEG circuit 47 as one image data file and written in a flash memory 48 as a nonvolatile memory, which is embedded in a memory card detachably attached as a recording medium of the digital still camera 10.

For the image data file written in the flash memory 48, for example, a file name such as "03033112340001.jpg", which has a predetermined number of digits including a date and time obtained from a timepiece section (not shown) and a serial number, is automatically added and recorded at the time of operating the shutter key 13.

The file name "03033112340001.jpg" indicates that the image data is the "0001"st still image data obtained at "(20) 03" (year), "03" (month), "31" (day), "12" (hour), "34" (minute) and compressed by JPEG.

The flash memory 48 may be incorporated in the digital still camera 10 independently of a detachable memory card. Alternatively, both a memory card and an internal memory may be used.

When the compression processing of the luminance and color difference signals of one frame and the write of the entire compressed data in the flash memory 48 are ended, the control unit 42 activates again the path from the CCD 33 to the DRAM 41.

A USB interface (I/F) 49 is also connected to the control unit 42. The USB interface 49 executes communication control in transmitting/receiving image data and the like to/from an external information device such as a personal computer that is connected by cable through a USB connector 50.

When the digital still camera 10 is placed on the cradle 11, as shown in FIG. 1, the USB interface 49 executes communication control in transmitting/receiving image data and the like to/from an external information device such as a personal computer that is connected by a USB cable (not shown) through the cradle 11.

The key input unit 46 has, in addition to the above-described shutter key 13, the power key 12, mode key 14, zoom key 19, menu key 20, ring key 21, set key 22, and display key 23. A signal by the operation on each key is directly sent to the control unit 42.

In photographing not a still image but a moving image, the above-described still image data recording in the DRAM 41 is executed continuously along the time axis while the shutter key 13 of the key input unit 46 is being operated. When the operation of the shutter key 13 is ended, or a predetermined limit time, e.g., 30 sec has elapsed, the series of still image data are data-compressed by the JPEG circuit 47. Then, a moving image data file of motion JPEG, which contains the series of data-compressed still image data, is generated and recorded in the flash memory 48.

In the reproduction mode, the control unit 42 selectively reads out image data recorded in the flash memory 48 and causes the JPEG circuit 47 to expand the compressed image data in accordance with procedures reverse to those of data compressed in the photographing mode. The expanded image data is held in the DRAM 41 through the DRAM interface 40. The contents held in the DRAM 41 are stored in the VRAM 44 through the VRAM controller 43. The image data is periodically read out from the VRAM 44 to generate a video signal which is reproduced and output on the display unit 18.

When the selected image data is not a still image but a moving image, reproduction of individual still image data that constitute the file of the selected moving image data is executed continuously along the time axis. When reproduction of all still image data is ended, reproduction and display are executed by using only still image data that is located at the start of the moving image data until the next reproduction instruction is issued.

Figure 3:
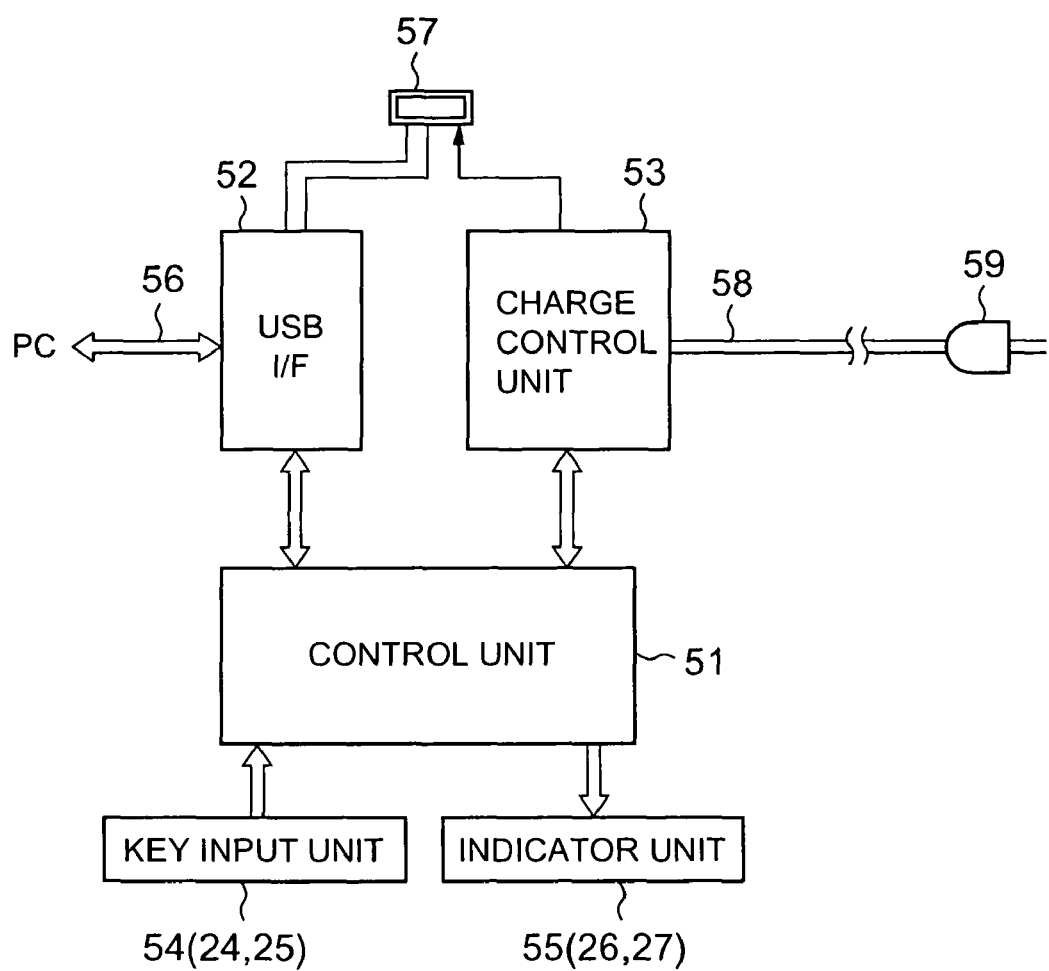
FIG. 3 is a block diagram showing the circuit arrangement in the cradle according to the first embodiment.

FIG. 3 shows the circuit arrangement in the cradle 11. The cradle 11 is constituted by connecting a USB interface (I/F) 52, charge control unit 53, key input unit 54, and indicator unit 55 to a control unit 51 that controls the entire cradle 11.

The USB interface 52 controls transfer of image data and the like, which is transmitted/received between an information device such as a personal computer (not shown) externally connected through a USB cable 56 and the digital still camera 10 connected to a USB connector 57.

The charge control unit 53 rectifies an AC power supply obtained when an AC plug 59 is connected to a home wall outlet (not shown) through an AC code 58, transforms the power supply to a DC power supply having a necessary voltage, and supplies the DC power to the circuits in the cradle 11. The charge control unit 53 also supplies the DC power for charging to the digital still camera 10 placed on the cradle 11 through the power line of the USB connector 57.

The key input unit 54 is formed from the "PHOTO" key 24 and USB key 25. These key inputs are directly input to the control unit 51.

The indicator unit 55 is formed from the charge indicator 26 and USB indicator 27, which are turned on to emit light on the basis of a control signal from the control unit 51.

The operation of the above embodiment will be described next.

Figure 4:
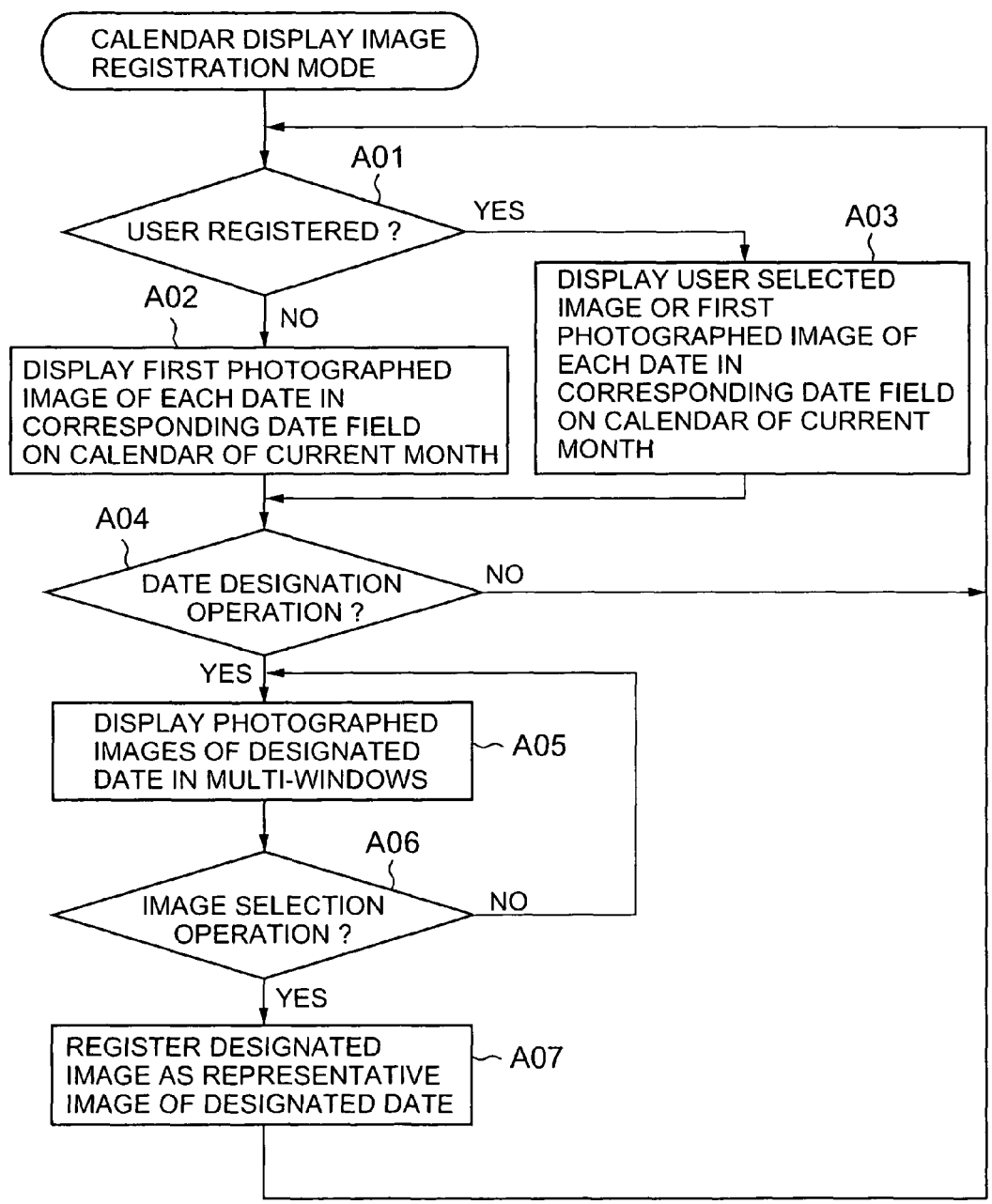
FIG. 4 is a flow chart showing processing contents in a calendar display image registration mode according to the first embodiment.

FIG. 4 shows processing contents mainly of the control unit 42, which are executed when the digital still camera 10 is placed on the cradle 11, as shown in FIG. 1, and a calendar display image registration mode in the reproduction mode as the basic mode is set.

At the start of processing, it is determined whether there is at least one image that is user-registered in advance in correspondence with each date of the current month obtained from the timepiece section (not shown) (step A01). This determination is done by, e.g., determining whether at least one image data file name corresponding to each date of the current month is user-registered in management data stored in the control unit 42 in advance.

If NO in step A01, a calendar image is reproduced and displayed on the display unit 18, in which image data having a file name corresponding to each date is inserted in the corresponding date field on the calendar of the current month (step A02).

In this case, if there is no image data having a file name corresponding to the date, only the numerical value of the date is displayed in the date field. Conversely, if there is one or a plurality of image data having file names corresponding to the date, an image having the earliest time information, i.e., an image that is located at the first position on the time axis is selected as the representative image of the date and read out from the flash memory 48. A simple image having a size corresponding to the size of the date field is created, inserted in the calendar image, and displayed.

Figure 5:
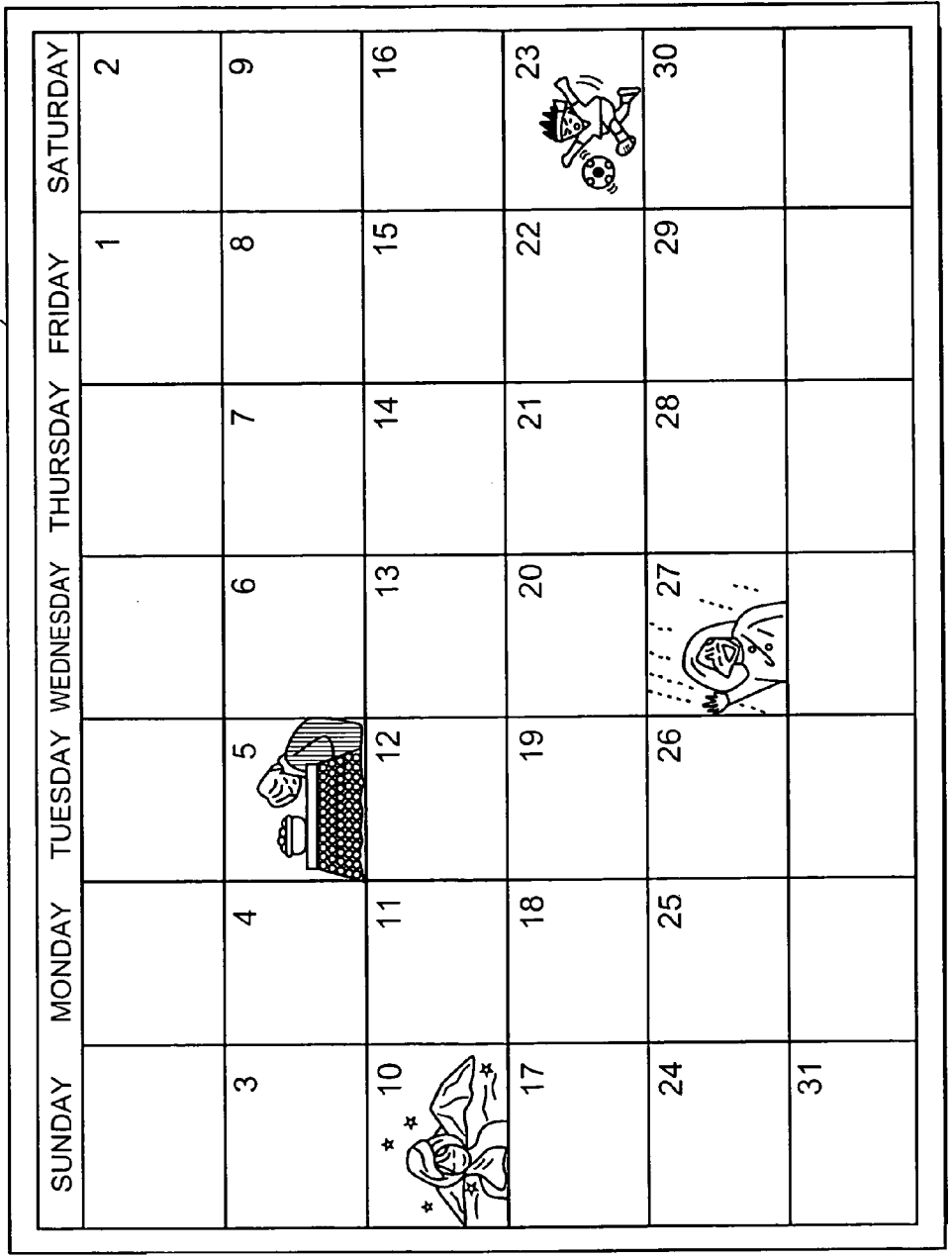
FIG. 5 is a view showing a calendar display image according to the first embodiment.

FIG. 5 shows a calendar image displayed on the display unit 18 in the above-described way. In the month, image data corresponding to days "5", "10", "23", and "27" are recorded in the flash memory 48. These image data are read out to create and display the calendar image.

When it is determined in step A01 that at least one image data file name is user-registered in correspondence with each date of the current month, a calendar image is reproduced and displayed on the display unit 18, in which the user-registered image data or, if there is no user-registered image data, image data having a file name corresponding to that date is inserted in each date field on the calendar of the current month (step A03).

In this case, if there is no image data having a file name corresponding to the date, only the numerical value of the date is displayed in the date field.

Conversely, if there is one or a plurality of image data having file names corresponding to the date, image data that is user-registered is preferentially selected as the representative image. If there is no user-registered image data, an image having the earliest time information, i.e., an image that is located at the first position on the time axis is selected as the representative image of the date and read out from the flash memory 48. A simple image having a size corresponding to the size of the date field is created, inserted in the calendar image, and displayed.

In the state wherein the calendar image corresponding to the presence/absence of user-registered image data is displayed in step A02 or A03, it is determined whether any one of the dates in the calendar image is designated (step A04). If NO in step A04, the flow returns to step A01. By repeating this processing, a standby state is set until any one of the dates in the calendar image is designated.

As for the designation of a date in the calendar image, for example, the current date position in the calendar image on the display unit 18 is displayed with a frame having a specific color and, for example, a red frame to discriminate it from the remaining dates. The frame display position is appropriately moved as the ring key 21 is operated vertically and horizontally. When the set key 22 is operated, the date displayed with the frame at that time is designated.

When any one of the dates in the calendar image is designated, this is determined in step A04. All image data having file names corresponding to that date are read out from the flash memory 48. Simple images are created by reducing the sizes of the respective images and displayed in multi-windows in place of the calendar image so that the images can be displayed on the display unit 18 as a list (step A05).

In the state wherein the image data corresponding to the same date are displayed in multi-windows, a standby state is set until one of the image data is designated (step A06).

Even in this case, as for the designation of image data in the multi-window display mode, for example, the image located at the first position of the multi-window display on the display unit 18 is displayed with a frame having a specific color and, for example, a red frame to discriminate it from the remaining images. The frame display position is appropriately moved as the ring key 21 is operated vertically and horizontally. When the set key 22 is operated, the image displayed with the frame at that time is designated.

When an image in the multi-windows is designated, this is determined in step A06. The designated image is defined as an image that represents the designated date. The file name of the designated image is stored in the management data in the control unit 42 in correspondence with the designated date (step A07). User registration for one date is thus ended. To execute user registration for another date, the flow returns to step A01.

As described above, the information of the date and time in recording is automatically set as the file name of image data. On the basis of the file name, a calendar image is displayed as a list of image data for which the number of image data for each date is limited to, e.g., only one.

Accordingly, the photographing date of an image can easily visually be recognized from the contents and position of the image data in the calendar display.

As compared to a case wherein the number of images displayed for each date is not limited, more date fields can simultaneously be displayed as a list. Alternatively, the display size of an image displayed in each date field can be increased. Hence, the visibility of calendar display can greatly be increased. This effect is especially large when the calendar is displayed on a display section with a small screen size.

In steps A02 and A03, image data recorded in the flash memory 48 is read out. A simple image is created by reducing the image data in accordance with the size of each date field of the calendar. The simple image is inserted into the calendar image and displayed. When the data of a thumbnail image recorded in association with original image data, which is defined by JPEG, is used for calendar image display, the amount of data necessary for image processing for calendar image display can be smaller. Hence, the time required for calendar image display can be shortened.

In correspondence with this, in this embodiment, the file name of image data recorded in the flash memory 48 for each date of the month is stored as management data stored in the control unit 42 as user registration is executed. Instead of the original image data, the file name of the above-described thumbnail image, which is recorded in association with the image data, may be stored.

The data amount of the thumbnail image is much smaller than that of the original image. Hence, not the file name but the thumbnail image data itself may be stored in correspondence with the management data and date.

Instead of storing the management data for user registration in the control unit 42, specific flag information may simply be additionally set for only user-registered image data recorded in the flash memory 48. In displaying the calendar image, the presence/absence of additional setting of the specific flag information may be determined.

Alternatively, management data may be created in advance, which registers, for all dates, the file name or thumbnail image of image data that is located at the first position on the time axis in a plurality of image data corresponding to each date. When user registration is executed, the management data of a corresponding date may be updated.

The file name of image data contains the information of the photographing date and time. However, the information of the photographing date and time may be embedded in a specific area of an image file or recorded in association with an image file.

Another operation of the above embodiment will be described next.

Figure 6:
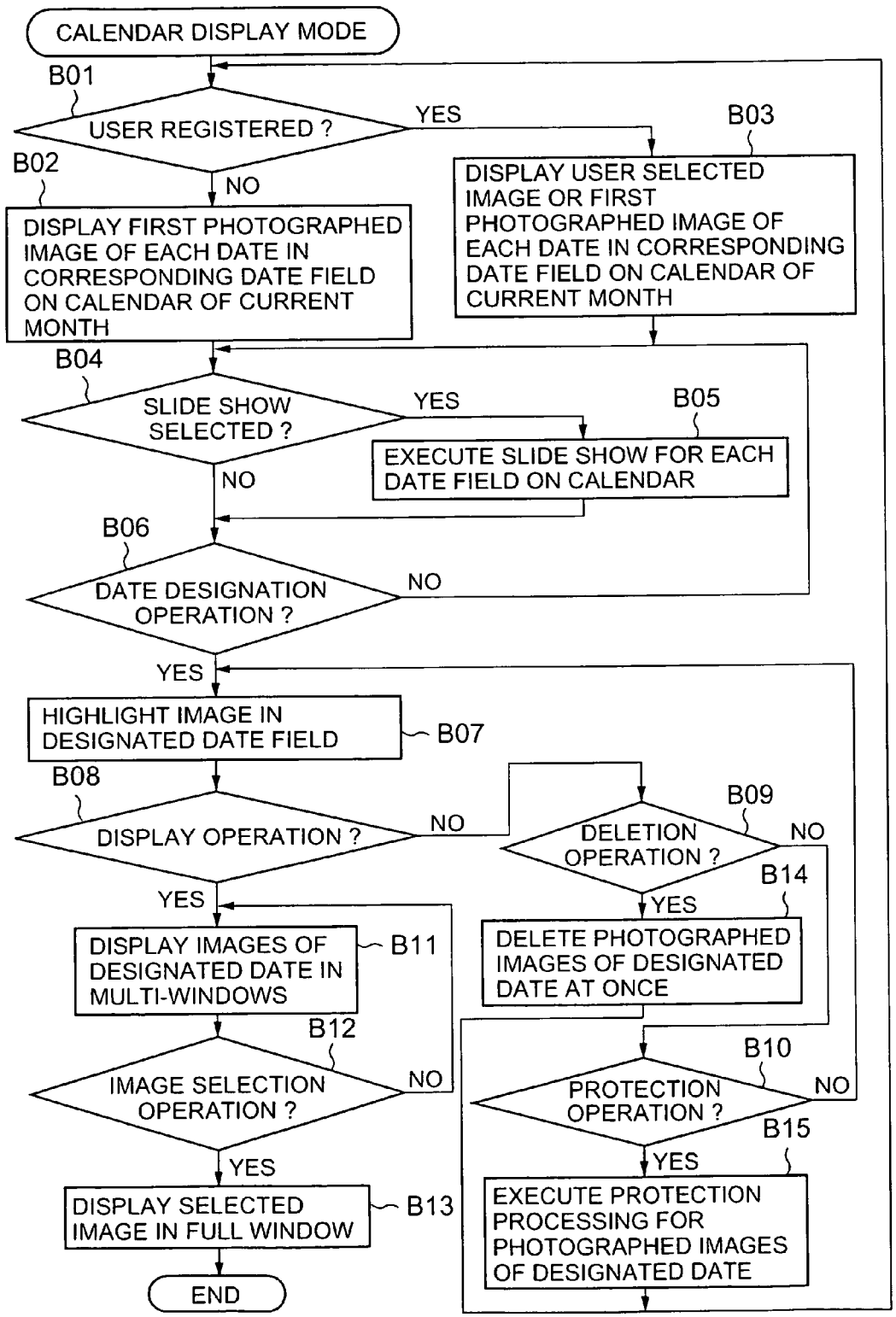
FIG. 6 is a flow chart showing processing contents in a calendar display mode according to the first embodiment.

FIG. 6 shows processing contents mainly of the control unit 42, which are executed when the digital still camera 10 is placed on the cradle 11, as shown in FIG. 1, and the calendar display mode in the reproduction mode as the basic mode is set.

At the start of processing, it is determined whether there is at least one image that is user-registered in advance in correspondence with each date of the current month (step B01). This determination is done by, e.g., determining whether at least one image data file name corresponding to each date of the current month is user-registered in management data stored in the control unit 42 in advance.

If NO in step B01, a calendar image is reproduced and displayed on the display unit 18, in which image data having a file name corresponding to each date is inserted in the corresponding date field on the calendar of the current month (step B02).

In this case, if there is no image data having a file name corresponding to the date, only the numerical value of the date is displayed in the date field. Conversely, if there is one or a plurality of image data having file names corresponding to the date, an image having the earliest time information, i.e., an image that is located at the first position on the time axis is selected as the representative image of the date and read out from the flash memory 48. A simple image having a size corresponding to the size of the date field is created, inserted in the calendar image, and displayed.

When it is determined in step B01 that at least one image data file name is user-registered in correspondence with each date of the month, a calendar image is reproduced and displayed on the display unit 18, in which the user-registered image data or, if there is no user-registered image data, image data having a file name corresponding to that date is inserted in each date field on the calendar of the current month (step B03).

In this case, if there is no image data having a file name corresponding to the date, only the numerical value of the date is displayed in the date field.

Conversely, if there is one or a plurality of image data having file names corresponding to the date, image data that is user-registered is preferentially selected as the representative image. If there is no user-registered image data, an image having the earliest time information, i.e., an image that is located at the first position on the time axis is selected as the representative image of the date and read out from the flash memory 48. A simple image having a size corresponding to the size of the date field is created, inserted in the calendar image, and displayed.

In the state wherein the calendar image corresponding to the presence/absence of user-registered image data is displayed in step B02 or B03, it is determined whether display of "slide show" (to be described later) is selected and instructed by operating the menu key 20, ring key 21, and set key 22 (step B04).

The "slide show" function sequentially circularly switches the image to be displayed every predetermined time, e.g., every 5 [sec] when a plurality of images correspond to each date field of the calendar image.

Only when it is determined in step B04 that display of "slide show" is selected and instructed, the above-described "slide show" function of switching the display image on each date field of the calendar image every predetermined time is executed (step B05).

In such a calendar image display state, it is determined whether any one of the dates in the calendar image is designated (step B06). If NO in step B06, the flow returns to step B04. By repeating this processing, a standby state is set until any one of the dates in the calendar image is designated while keeping the calendar image displayed.

As for the designation of a date in the calendar image, for example, the current date position in the calendar image on the display unit 18 is displayed with a frame having a specific color and, for example, a red frame to discriminate it from the remaining dates. The frame display position is appropriately moved as the ring key 21 is operated vertically and horizontally. When the set key 22 is operated, the date displayed with the frame at that time is designated.

When any one of the dates in the calendar image is designated, this is determined in step B06. The image in the designated date field is highlighted by, e.g., making its size slightly larger than the images in the remaining date fields (step B07). It is repeatedly determined whether an operation for instructing display of the image in the date field is performed (step B08), whether an operation for instructing deletion of the image is executed (step B09), or whether an operation for instructing protection of the image is executed (step B10). A standby state is set until any one of the instructions is issued.

More specifically, the determination in step B08 is done on the basis of, e.g., the presence/absence of the further operation of the set key 22. When it is determined that the set key 22 is further operated, and the operation for instructing display of the image in the date field is executed, all image data having file names corresponding to that date are read out from the flash memory 48. Simple images are created by reducing the sizes of the respective images and displayed in multi-windows in place of the calendar image so that the images can be displayed on the display unit 18 as a list (step B11).

In the state wherein the image data corresponding to the same date are displayed in multi-windows, a standby state is set until one of the image data is selected (step B12).

In this case, as for the selection of image data in the multi-window display mode, for example, the image located at the first position of the multi-window display on the display unit 18 is displayed with a frame having a specific color and, for example, a red frame to discriminate it from the remaining images. The frame display position is appropriately moved as the ring key 21 is operated vertically and horizontally. When the set key 22 is operated, the image displayed with the frame at that time is selected.

When an image in the multi-windows is selected, this is determined in step B12. The selected image is displayed in the full window of the display unit 18 in place of the multi-window display mode (step B13). The processing shown in FIG. 6 is temporarily ended. The full window display of the selected image data on the display unit 18 is continued.

In step B09, more specifically, in a state wherein a specific date is designated, the menu key 20 is operated to display a menu item "delete". When this menu item is selected by operating the ring key 21, and the set key 22 is operated subsequently, it is determined that the operation for instructing deletion is executed. If it is determined that this operation is executed, and it is confirmed that the image data having the file names corresponding to the designated date have no protection designation (to be described later), all the image data are erased from the flash memory 48 at once (step B14).

In this case, in fully erasing the image data, instead of immediately executing the erase operation after the deletion operation, a guide message such as "Will you erase all images of selected date? YES/NO"

is displayed on the display unit 18. The cursor is displayed on "NO". When the cursor is moved to "YES" by operating the left key of the ring key 21, and the set key 22 is executed after that, it is newly determined that erase of the image data should be executed. With this operation, one excess operation step is added to the erase of image data to prevent any erase error.

After the full erase of the image data corresponding to the designated date is executed, the flow returns to the processing in step B01.

In step B10, more specifically, in a state wherein a specific date is designated, the menu key 20 is operated to display a menu item "protect". When this menu item is selected by operating the ring key 21, and the set key 22 is operated subsequently, it is determined that the operation for designating protection is executed. If it is determined that this operation is executed, batch processing is executed to additionally set, for all image data having file names corresponding to the designated date, protection designation information on the flash memory 48 (step B15).

After the full erase of the image data corresponding to the designated date is executed, the flow returns to the processing in step B01.

As described above, when the "slide show" function is selected, image data sequentially automatically switched and displayed one by one in each date field of the calendar image as if it were automatic slide display. Hence, the user of the digital still camera 10 can visually recognize all the contents of image data corresponding to each date without executing any operation in the calendar image display state. In addition, the digital still camera 10 and cradle 11 can be used as an interior that executes dynamic display using original images.

That is, as compared to a case wherein the number of images displayed for each date is not limited, more date fields can simultaneously be displayed as a list. Alternatively, the display size of an image displayed in each date field can be increased. In addition to the above-described effects, all the contents of a plurality of image data corresponding to each date can be confirmed in the list display state.

Furthermore, a date for which batch processing should be executed can be designated (selected) on the calendar. Editing processing such as deletion or protection designation can be executed at once for a plurality of image data corresponding to the designated date. For this reason, the editing operation for recorded images can be simplified.

A display key, deletion key, and protection key may be arranged such that the above-described display operation, deletion operation, and protection operation in steps B08 through B10 can be executed by one key operation.

With the above arrangement, batch processing for image data corresponding to a date designated on the calendar can be executed more easily.

Second Embodiment

The second embodiment in which the present invention is applied to a digital still camera will be described below with reference to the accompanying drawing.

Figure 2:
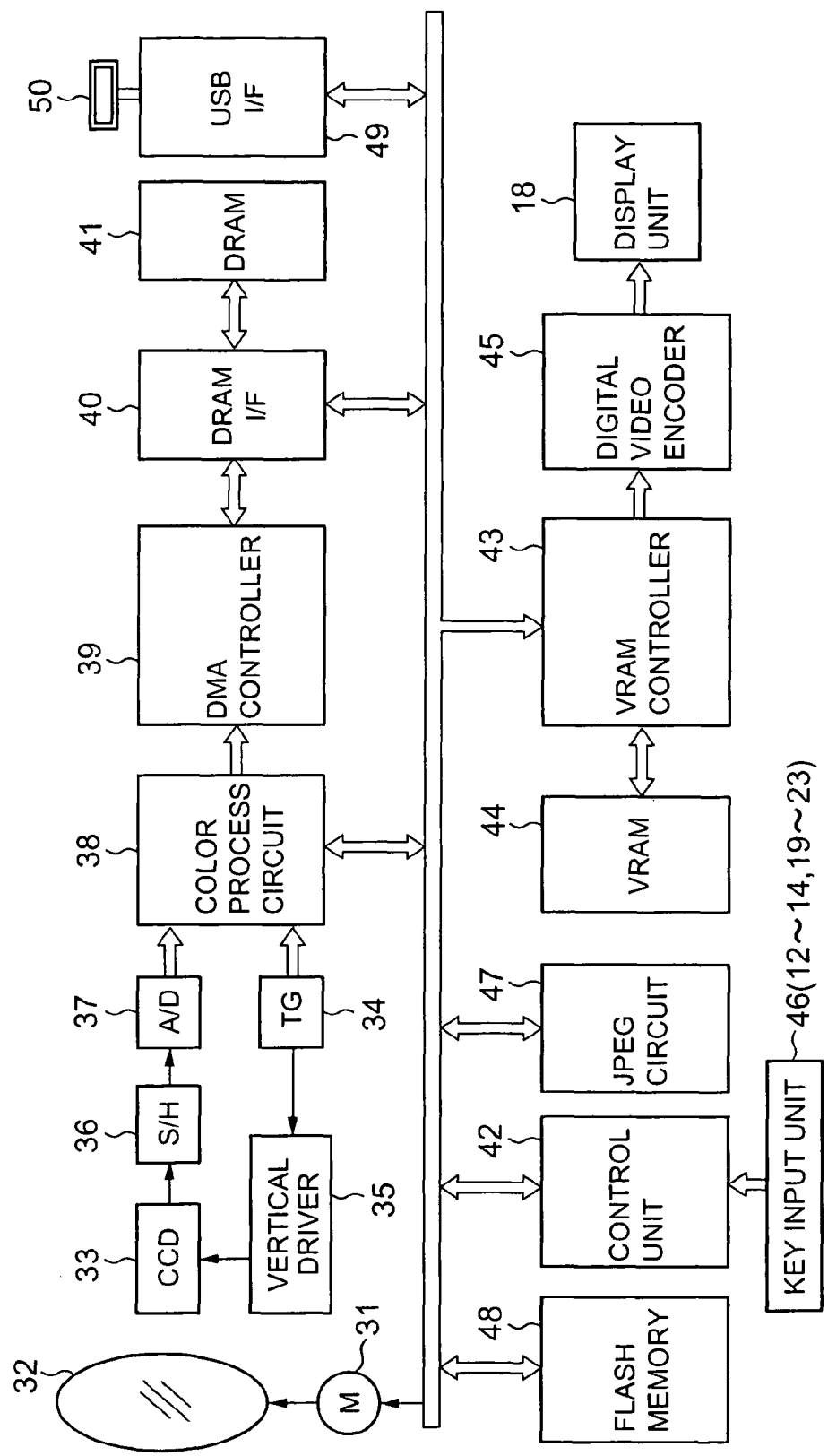
FIG. 2 is a block diagram showing the circuit arrangement of a digital still camera according to the first embodiment.

The outer appearance of a digital still camera according to the second embodiment of the present invention, which is placed on a cradle serving as a charger, the circuit arrangement of the digital still camera, and the circuit arrangement in the cradle are basically the same as those shown in FIGS. 1, 2, and 3, respectively. The same reference numerals as in FIGS. 1, 2, and 3 denote the same parts in the second embodiment, and an illustration and description thereof will be omitted.

The operation of this embodiment will be described next.

Figure 7:
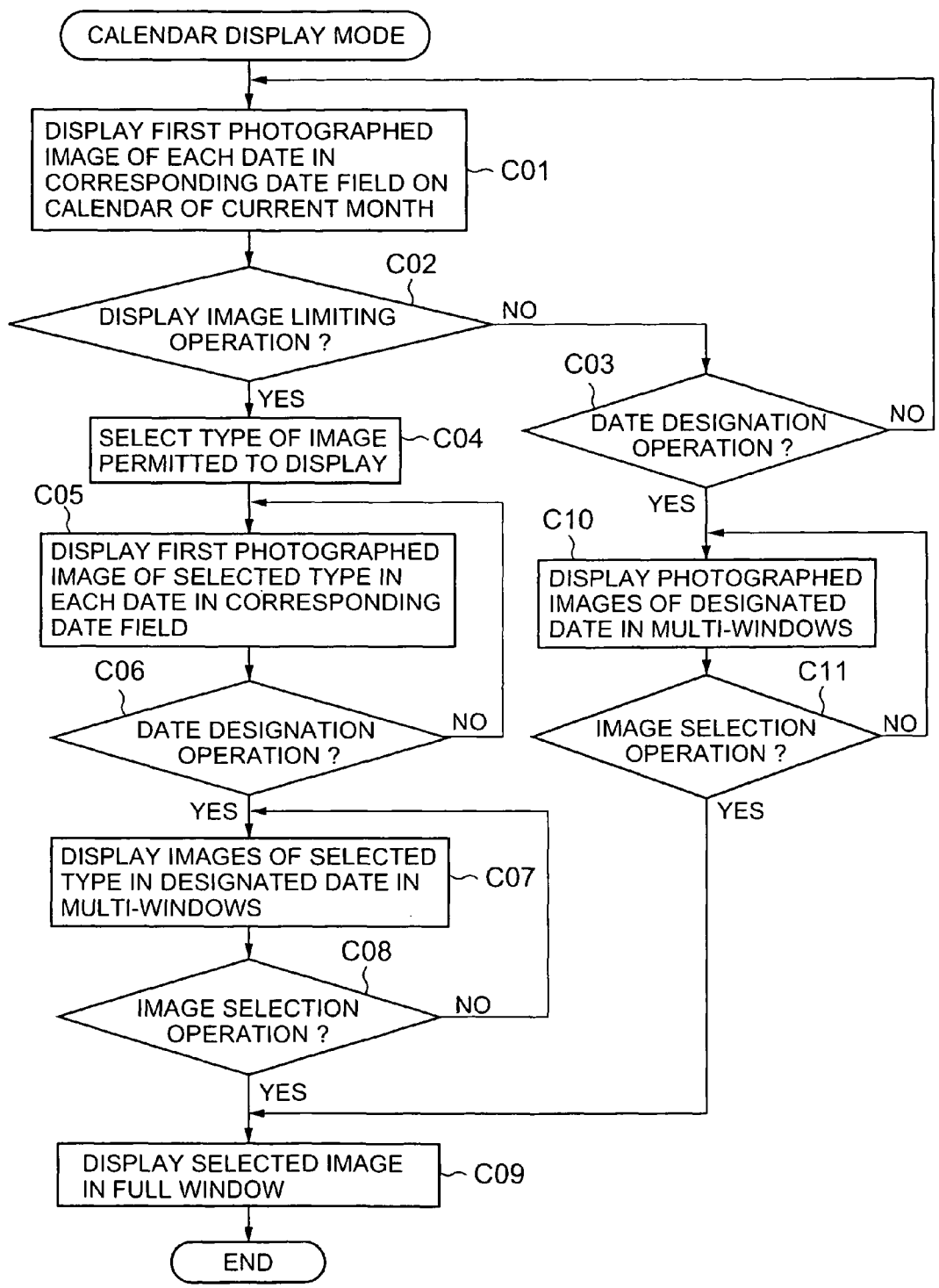
FIG. 7 is a flow chart showing processing contents in a calendar display mode according to the second embodiment of the present invention.

FIG. 7 shows processing contents mainly of a control unit 42, which are executed when a digital still camera 10 is placed on the cradle 11, as shown in FIG. 1, and a calendar display mode in the reproduction mode as the basic mode is set.

At the start of processing, a calendar image is reproduced and displayed on a display unit 18 on the basis of image data recorded in a flash memory 48, in which image data having a file name corresponding to each date is inserted in the corresponding date field on the calendar of the current month (step C01).

In this case, if there is no image data having a file name corresponding to the date, only the numerical value of the date is displayed in the date field. Conversely, if there is one or a plurality of image data having file names corresponding to the date, an image having the earliest time information, i.e., an image that is located at the first position on the time axis is selected as the representative image of the date and read out from the flash memory 48. A simple image having a size corresponding to the size of the date field is created, inserted in the calendar image, and displayed.

In the calendar image display state, it is repeatedly determined whether an operation for limiting image data to be displayed is executed (step C02) or whether any one of the dates in the calendar image is designated (step C03), thereby setting a standby state until one of these operations is executed.

In step C02, more specifically, for example, a menu key 20 is operated to display a menu item "limit display image". When this menu item is selected by operating a ring key 21, and a set key 22 is operated subsequently, it is determined that the instruction operation is executed. If it is determined that this operation is executed, and the type of images that are permitted to display on the calendar image is selected (step C04).

For example, image data having protection setting, image data which are already designated for printing and have DPOF (Digital Print Order Format) information, image data of still images having a data file extension ".jpg", image data of moving images having a data file extension ".avi" or ".mpg", and image data having different resolutions including high-resolution images are displayed as a menu in advance. The user can arbitrarily select and set the type of images.

When the type of images that are permitted to display is set in step C04, image data recorded in the flash memory 48 are searched again on the basis of the selected and set contents. A calendar image is reproduced and displayed on the display unit 18, in which image data having a file name corresponding to each date and the image type permitted to display is inserted in the corresponding date field on the calendar of the current month (step C05).

Even in this case, if there is at least one image data having file names corresponding to the date and selected and set type, an image having the earliest time information, i.e., an image that is located at the first position on the time axis is selected as the representative image of the date and read out from the flash memory 48. A simple image having a size corresponding to the size of the date field is created, inserted in the calendar image, and displayed.

In the state wherein the calendar image in which the type of images permitted to display is limited by user selection and setting is displayed, it is determined whether any one of the dates in the calendar image is designated (step C06). If NO in step C06, the flow returns to calendar image display processing in step C05. By repeating this processing, a standby state is set until any one of the dates in the calendar image is designated while keeping the calendar image displayed.

As for the designation of a date in the calendar image, for example, the current date position in the calendar image on the display unit 18 is displayed with a frame having a specific color and, for example, a red frame to discriminate it from the remaining dates. The frame display position is appropriately moved as the ring key 21 is operated vertically and horizontally. When the set key 22 is operated, the date displayed with the frame at that time is designated.

When any one of the dates in the calendar image is designated, this is determined in step C06. All image data corresponding to the designated date and belonging to the type permitted to display are read out from the flash memory 48. Simple images are created by reducing the sizes of the respective images and displayed in multi-windows in place of the calendar image so that the images can be displayed on the display unit 18 as a list (step C07).

In the state wherein the image data corresponding to the same date and the type permitted to display are displayed in multi-windows, a standby state is set until one of the image data is selected (step C08).

In this case, as for the selection of image data in the multi-window display mode, for example, the image located at the first position of the multi-window display on the display unit 18 is displayed with a frame having a specific color and, for example, a red frame to discriminate it from the remaining images. The frame display position is appropriately moved as the ring key 21 is operated vertically and horizontally. When the set key 22 is operated, the image displayed with the frame at that time is selected.

When an image in the multi-windows is selected, this is determined in step C08. The selected image is displayed in the full window of the display unit 18 in place of the multi-window display (step C09). The processing shown in FIG. 7 is temporarily ended. The full window display of the selected image data on the display unit 18 is continued.

In step C03, more specifically, when the set key 22 is operated in a state wherein a specific date is designated, it is determined that the date designation operation is executed. If it is determined that this operation is executed, all image data having file names corresponding to the designated date are read out from the flash memory 48. Simple images are created by reducing the sizes of the respective images and displayed in multi-windows in place of the calendar image so that the images can be displayed on the display unit 18 as a list (step C10).

In the state wherein the image data corresponding to the same date are displayed in multi-windows, a standby state is set until one of the image data is selected (step C11).

In this case, as for the selection of image data in the multi-window display mode, for example, the image located at the first position of the multi-window display on the display unit 18 is displayed with a frame having a specific color and, for example, a red frame to discriminate it from the remaining images. The frame display position is appropriately moved as the ring key 21 is operated vertically and horizontally. When the set key 22 is operated, the image displayed with the frame at that time is selected.

When an image in the multi-windows is selected, this is determined in step C11. The selected image is displayed in the full window of the display unit 18 in place of the multi-window display mode (step C09). The processing shown in FIG. 7 is temporarily ended. The full window display of the selected image data on the display unit 18 is continued.

As described above, the type of images recorded in the flash memory 48 is selected and set. The user arbitrarily selects and sets the type of image data recorded in the flash memory 48 to permit their display as individual image data of the calendar image.

With this arrangement, the type such as moving images or still images, or the resolution of images is limited. Calendar (list) display of images unnecessary for the user is inhibited to decrease the number of images displayed on the calendar. Hence, the visibility can be increased. In addition, the entire contents displayed on the calendar on the display unit 18 can have a unity corresponding to the user's taste.

In the first and second embodiments, assume that a desired date is designated in the calendar, and display of image data corresponding to the date is designated. If only one image data corresponding to the date is present, full window display is immediately executed without executing multi-window display. If there is no image data corresponding to the date, an error message is displayed to notify the user that image data display is impossible.

In the first embodiment, only one arbitrary date on the calendar image is designated. Desired batch processing such as data deletion or protection designation is executed for image data corresponding to the designated date. However, a plurality of dates on the calendar may simultaneously be designated. The contents of batch processing may be designated after that designated such that the batch processing with the designated processing contents can be executed for image data corresponding to the plurality of designated dates.

As described above, when a plurality of image data to be subjected to certain batch processing can be designated, processing of the image data to be recorded in the flash memory 48 can be further simplified.

In the first embodiment, a calendar image is displayed in which one representative image data is selected from all image data corresponding to each date field. In this state, when the user selects and designates the "slide show" function, the image data is sequentially automatically switched and displayed every predetermined time in all date fields to which a plurality of image data correspond. However, the user selection/designation need not particularly be executed. The "slide show" function may automatically start when the calendar image is displayed. In addition, the "slide show" function may be executed for only images in one or a plurality of date fields selected and designated by the user.

In the above-described "slide show" function, one image data displayed in one date field may instantaneously be switched to another image data at a certain time. Alternatively, the image data may be switched by scrolling two image data in a date field over a certain period of time.

In the first embodiment, in the calendar display mode, the image displayed in each date field is automatically scrolled. However, the image in a date field designated by the user may be scrolled manually.

Even in this arrangement, all contents of a plurality of image data corresponding to each date can be confirmed in the calendar display state.

In the first embodiment, in the calendar display image registration mode, when the user designates a desired date, image data having file names corresponding to that date are displayed as a list in a multi-window display mode. A representative image is selected from the list and registered. When the user designates a desired date in the calendar image display state, the image displayed in the date field can manually be scrolled by, e.g., operating an up and down keys of the ring key 21. The user may display a desired image by the manual scroll operation such that a displayed image can be registered as the representative image of the date field by, e.g., operating the set key 22.

In the first embodiment, the operation in the calendar display image registration mode and that in the calendar display mode have separately been described. A desired image may be selected during the calendar display mode and registered as the representative image of the date field.

This operation can be implemented by the following program. During the operation in the calendar display mode shown in, e.g., FIG. 6, a date field designated by the user is highlighted to be more noticeable than the remaining date fields in step B07. When the image registration operation is executed in this state, processing in steps A05 through A07 in the calendar display image registration mode shown in FIG. 4 is executed.

In the first and second embodiments, unless the user especially registers an image, of image data having file names corresponding to that date, an image that is located at the first position on the time axis is automatically selected as the representative image of the date field. Instead of selecting the image photographed for the first time on the day as the default representative image, an image located at the intermediate position, last position, or second or third position may be displayed as the representative image.

In the first embodiment, when the deletion operation or protection operation is executed, all image data corresponding to the designated date are processed at once. Not only the two processing operations but also processing operations such as image data transfer, printing designation, and image conversion may be executed at once.

In the second embodiment, during the calendar display mode, in a state wherein the representative image of each date is displayed in the corresponding date field in the calendar image, a user operation for limiting the display image is executed to select the type of images that are permitted to display in the calendar image. Then, only the images of the selected type are used in the calendar image. Instead, when the calendar display mode is selected, only images of type based on image type information that is predetermined or set by the user in advance may be inserted and displayed in the calendar image.

In the first and second embodiments, only one image is displayed in each date field of the calendar image. However, a plurality of images may be displayed in one date field.

For example, all image data corresponding to the date may be read out from the flash memory 48 and subjected to large-scale pixel thinning such that multi-window display can be executed in each date field. Alternatively, only a predetermined number of image data, e.g., only two or three image data corresponding to the date may be displayed in one date field at maximum.

In the first and second embodiments, a monthly calendar with days is displayed in a calendar image. However, the present invention is not limited to this and can be applied to any display of a specific period that is segmented into predetermined term units. For example, the present invention can be applied to display of an annual calendar with 12 months or a daily calendar with 24 hours.

In the first and second embodiments, a display area corresponding to image data is selected from a plurality of display areas on the basis of a photographing time that is recorded in the flash memory 48 in association with the image data, and the image data is displayed in that display area. However, the present invention is not limited to the photographing time. For example, a photographing site name based on a photographing location acquired by a GPS (Global Positioning System) function or a facility name, a photographing condition such as the presence/absence of use of the electronic flash or the shutter speed, an image type such as a moving or still image or image contents, or a classification code that is arbitrarily input by the user may be recorded in association with image data. On the basis of the associated information, an area where image data should be displayed may be selected, and the image data may be selected in that area.

In the first and second embodiments, a display area corresponding to image data is selected from a plurality of display areas on the basis of photographing information that is recorded in the flash memory 48 in association with the image data, and the image data is displayed in that display area. That is, even display areas where no image data are displayed are also displayed together with display areas where image data are displayed. However, the display areas where no image data are displayed need not always be displayed. The image data may be classified on the basis of photographing information recorded in the flash memory 48 in association with the image data, and the classified image data may be displayed in a list.

In both the first and second embodiments, the present invention is applied to a digital still camera. However, the present invention can be applied to any other devices having a photographing function and various kinds of display sections, such as a video movie camera or a cellular phone terminal, PDA (Personal Digital Assistant), personal computer, or TV receiver having a camera function.

In both the first and second embodiments, the present invention is applied to a device having a photographing function. However, the present invention can be applied to any other devices having various kinds of display sections, such as a cellular phone terminal, PDA, personal computer, or TV receiver having no camera function.

Third Embodiment

The third embodiment in which the present invention is applied to a digital still camera will be described below with reference to the accompanying drawing.

The circuit arrangement of a digital still camera according to the third embodiment of the present invention is basically the same as that shown in FIG. 2. The same reference numerals as in FIG. 2 denote the same parts in the third embodiment, and an illustration and description thereof will be omitted.

The operation of this embodiment will be described next.

Figure 8:
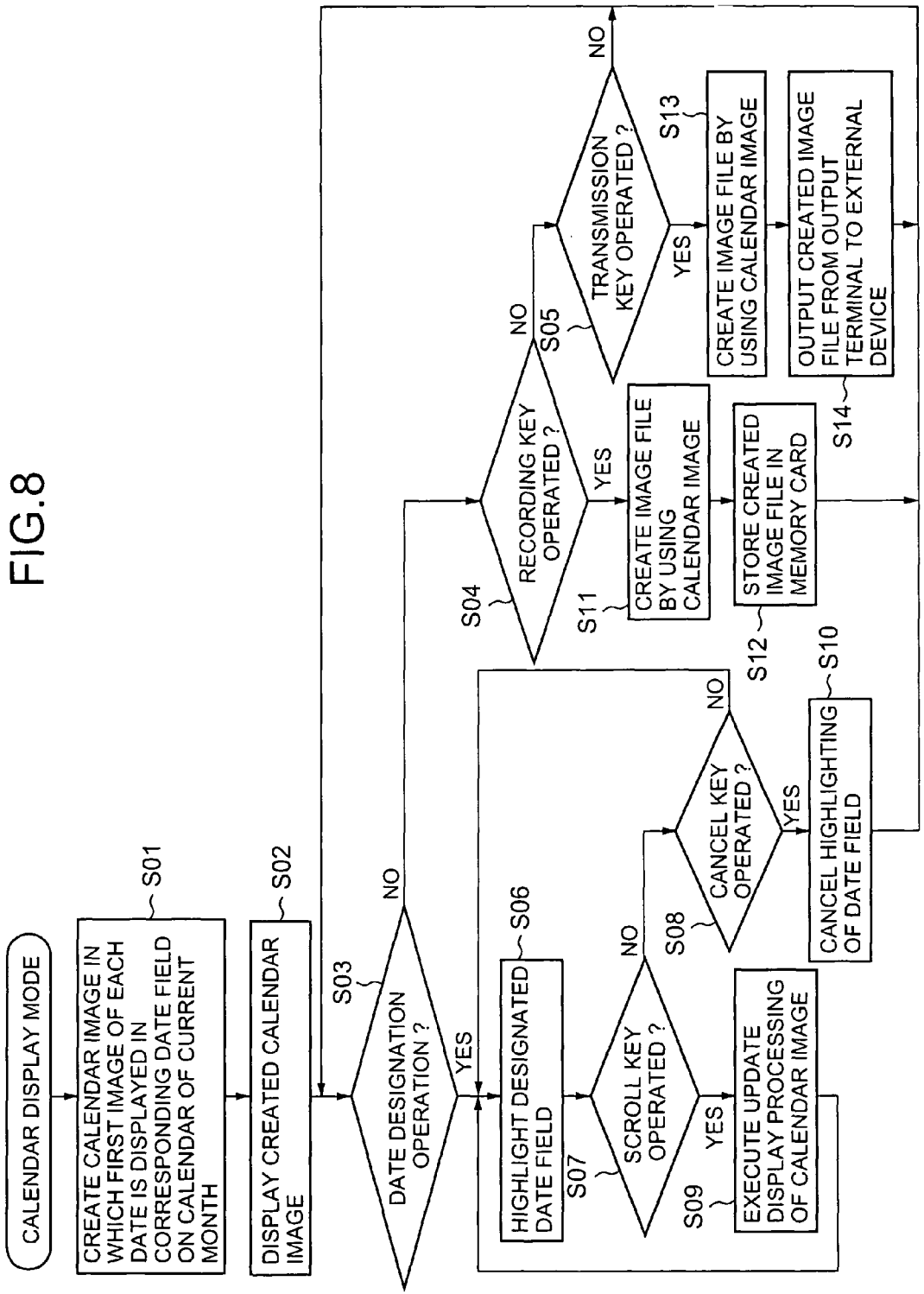
FIG. 8 is a flow chart showing processing contents in a calendar display mode according to the third embodiment of the present invention.

FIG. 8 shows processing contents mainly of a control unit 42, which are executed when a calendar display mode in the reproduction mode as the basic mode is set.

At the start of processing, a calendar image is bitmapped and created on a DRAM 41, in which image data having a file name corresponding to each date is inserted to the corresponding date field on the calendar of the current month in correspondence with current date information obtained from a timepiece section (not shown) in the control unit 42 and calendar data stored in a ROM (step S01), and displayed on a display unit 18 (step S02).

In this case, if there is no image data having a file name corresponding to the date, only the numerical value of the date is displayed in the date field. Conversely, if there is one or a plurality of image data having file names corresponding to the date, an image having the earliest time information, i.e., an image photographed for the first time on the day is selected as the representative image of the date and read out from a flash memory 48. A simple image is created by reducing the image in accordance with the size of the date field, inserted in and synthesized with the calendar image bitmapped on the DRAM 41, and displayed.

FIG. 5 shows an example of a calendar image displayed on the display unit 18 in the above-described way. In this month, image data corresponding to days "5", "10", "23", and "27" are recorded in the flash memory 48. These image data are read out to create and display the calendar image.

In the state wherein the calendar image is displayed in step S02, it is repeatedly determined whether any one of the dates in the calendar image is designated (step S03), whether a key operation for recording the calendar image is executed (step S04), or whether a key operation for transmitting the calendar image to an external device is executed (step S05). A standby state is set until any one of the key operations is performed.

Determination of the date designation in step S03 is done by determining whether the cursor key and set key in a key input unit 46 are operated to designate an arbitrary date in the calendar image. If it is determined that the designation is done, the image of that date is highlighted by enlarging the image until it overlaps the neighboring date fields by a predetermined width (step S06).

The arbitrary date field in the calendar image is highlighted by slightly enlarging it in the above way. In this state, it is repeatedly determined whether, e.g., the cursor key is operated to scroll the image (step S07) or whether, e.g., the menu key is operated to cancel the highlight display of the designated date field (step S08), thereby setting a standby state until one of these key operations is executed.

When the key operation for scrolling the image is executed, this is determined in step S07. Update display processing is executed to newly display another image corresponding to the same date field (step S09). Then, the flow returns to processing in step S06.

When it is determined in step S08 that the key operation for canceling highlight display of the designated date field is executed, cancel processing is executed in correspondence with the key operation to return the highlighted date field to the same size as that of the remaining date fields (step S10). Then, the flow returns to processing in step S03.

The key operation for instructing recording of the calendar image in step S04 is determined on the basis of, e.g., the presence/absence of the operation of the shutter key. If it is determined that recording is instructed, the calendar image displayed on the display unit 18 at that time, i.e., the calendar image data bitmapped and stored on the DRAM 41 is immediately compressed by a JPEG circuit 47. New image file data is created by using obtained code data (step S11). The created image file data is stored in the flash memory 48 (step S12). Then, the flow returns to processing in step S03.

As described above, when the created image file data is recorded in the flash memory 48 in the same form as that of the image file data obtained by photographing, the created image file data can be used many times as needed.

The key operation for instructing transmission of the calendar image in step S05 is determined on the basis of, e.g., the presence/absence of the operation of the set key. If it is determined that transmission is instructed, the calendar image displayed on the display unit 18 at that time, i.e., the calendar image data bitmapped and stored on the DRAM 41 is immediately compressed by the JPEG circuit 47. New image file data is created by using obtained code data (step S13). The created image file data is transmitted from a USB interface 49 to an external device such as a personal computer connected by cable through a USB connector 50 (step S14). Then, the flow returns to processing in step S03.

To easily transmit the created image file data to an external device through the USB interface 49, a personal computer, cellular phone, or printer is arbitrarily connected in advance as an external device. Accordingly, the image file data of the created calendar image can easily be used in various ways.

In the third embodiment, a calendar image is created and displayed, in which only one representative image is arranged in one date field. However, a calendar image may be created and displayed, in which a plurality of images are arranged in one date field.

For example, a calendar image may be created and displayed, in which all images photographed on a certain day are arranged in the corresponding date field. Alternatively, a calendar image may be created and displayed, in which only a predetermined number of images (two or three images) of all images photographed in a certain day are arranged in the corresponding date field as representative images.

In the third embodiment, the user can select one representative image for each date field. Instead, the user may be able to select a plurality of representative images for each date field such that a calendar image can be created and displayed, in which the plurality of selected images are arranged in one date field.

In the third embodiment, a calendar image is created and displayed, in which the image photographed for the first time on the day is arranged in the corresponding date field as the default representative image. Instead, a calendar image may be created and displayed, in which an image located at the intermediate position, last position, or second or third position in a plurality of images photographed on the day is displayed as the representative image.

In the third embodiment, when the user selects the calendar display mode, calendar data is read out from the ROM on the basis of the current date obtained from the timepiece section in the control unit 42 and bitmapped and stored on the DRAM 41 serving as a buffer memory. In addition, the photographing date data of each image file recorded in the flash memory 48 is referred to. Of the image files obtained and recorded in the current month, image files that are recorded for the first time for the respective dates are reduced, inserted in, and synthesized with the corresponding date fields on the calendar data bitmapped on the DRAM 41. With this processing, the calendar image data is created and displayed.

However, the calendar image data may be displayed by another method to be described below. That is, in photographing/recording in the recording mode, a thumbnail image (reduced image) may be embedded in the image file. Alternatively, a thumbnail image may be recorded in association with an image file. When the user selects the calendar display mode, thumbnail images corresponding to images necessary for creating calendar image data are read out, inserted in and synthesized with the corresponding date fields on the calendar data bitmapped on the DRAM 41, thereby creating and displaying the calendar image data.

In this case, the thumbnail image preferably has a size that is appropriate for insert to the date field of the calendar data and requires no resize in creating the calendar image data.

Alternatively, in photographing/recording, a thumbnail image for calendar image data creation is created independently of recording of an image file. This thumbnail image is recorded in a predetermined area of the flash memory 48 in correspondence with the photographing date data. When the user selects the calendar display mode, the thumbnail images that are recorded for calendar image data creation are read out, inserted in and synthesized with the corresponding date fields on the calendar data bitmapped on the DRAM 41, thereby creating and displaying the calendar image data.

In the third embodiment, image file data is output by wire connection from an external connection terminal such as the USB connector 50 provided on the digital still camera. When a device having a wireless communication function, like a cellular phone terminal having a camera function, is used, an image file can be transmitted to a transmission address desired by the user. In this case, the created calendar image can easily be presented to the transmission partner.

In the third embodiment, the present invention is applied to a calendar display mode that displays a monthly calendar with days. However, the present invention may be applied to a calendar display mode that displays an annual calendar with 12 months or a calendar display mode that displays a daily calendar with 24 hours.

In the third embodiment, the present invention is applied to an arrangement which creates and displays a list image in which photographed images classified on the basis of the photographing time are displayed in a list (as a calendar image). However, the present invention may be applied to an arrangement which creates and displays a list image in which images classified on the basis of, e.g., a photographing position (location) using position information acquired by a GPS (Global Positioning System) function or a facility name, a photographing condition such as the presence/absence of use of the electronic flash, an image type such as a moving or still image, or a classification code that is arbitrarily assigned by the user are displayed in a list.

In the third embodiment, the present invention is applied to a digital still camera having an image list display function. However, the present invention can be applied to a video movie camera or a cellular phone terminal, PDA (Personal Digital Assistant), or personal computer having a camera function and an image list display function. The present invention can also be applied to a cellular phone terminal, PDA, personal computer, or TV receiver having no camera function but an image list display function.

The present invention is not limited to the above-described embodiments, and various changes and modifications can be made without departing from the spirit and scope of the present invention.

What is claimed is:

1. An image reproduction apparatus which is connectable to a memory configured to record photographed image data and photographing information of the photographed image data in association with each other, the image reproduction apparatus comprising:
    a display;
    a first display control unit configured to set a given number of display areas on the display, the display areas each being assignable to one of a plurality of different image groups;
    a display area selection unit configured to select from among the display areas, based on the photographing information recorded in the memory, a display area to which an image group of the photographed image data recorded in the memory is assigned;
    a second display control unit configured to limit a number of the photographed image data, from among all of the photographed image data of the image group assigned to the selected display area, to be simultaneously displayed in the selected display area to a predetermined number; and
    a third display control unit configured to first display in the selected display area a first set of photographed image data from among the photographed image data of the image group assigned to the selected display area, and then to display at least one different successive set of photographed image data from among the photographed image data of the image group assigned to the selected display area, while maintaining display control of the first and second display control units, thereby continuously displaying, in the selected display area, all of the photographed image data of the image group assigned to the selected display area, wherein a number of the photographed image data in the first set and each successive set is limited to the predetermined number set by the second display control unit.

2. The apparatus according to claim 1, wherein the photographing information comprises information representing a photographing time of the photographed image data.

3. The apparatus according to claim 1, wherein the photographing information comprises information representing a photographing position of the photographed image data.

4. The apparatus according to claim 1, wherein the photographing information comprises information representing a type of the photographed image data.

5. The apparatus according to claim 1, wherein the second display control unit includes an image selection unit configured to select the predetermined number of photographed image data having earliest photographing times, and a selected image display control unit configured to simultaneously display, in the selected display area, the predetermined number of photographed image data selected by the image selection unit.

6. The apparatus according to claim 1, wherein the second display control unit includes an image selection unit configured to select arbitrary photographed image data up to the predetermined number, and a selected image display control unit configured to simultaneously display, in the selected display area, the predetermined number of photographed image data selected by the image selection unit.

7. The apparatus according to claim 1, wherein the second display control unit limits the predetermined number of photographed image data to be simultaneously displayed in the selected display area to one.

8. The apparatus according to claim 1, further comprising a display area designation unit configured to designate an arbitrary display area of the given number of display areas, and an image processing unit configured to execute predetermined image processing at once for a plurality of photographed image data to be displayed in the arbitrary display area designated by the display area designation unit.

9. The apparatus according to claim 8, wherein the display area designation unit designates a plurality of arbitrary display areas of the given number of display areas, and the image processing unit executes the predetermined image processing at once for a plurality of photographed image data to be displayed in each of the plurality of display areas designated by the display area designation unit.

10. The apparatus according to claim 8, further comprising an image processing designation unit configured to designate a type of image processing, and wherein the image processing unit executes image processing of the type designated by the image processing designation unit at once for the plurality of photographed image data.

11. The apparatus according to claim 1, wherein the second display control unit also limits a type of photographed image data to be displayed in the selected display area.

12. The apparatus according to claim 11, further comprising an image type designation unit configured to designate the type of photographed image data, and wherein the second display control unit limits the type of photographed image data to be displayed in the selected display area based on the type of photographed image data designated by the image type designation unit.

13. The apparatus according to claim 1, wherein:
the first display control unit includes a setting unit configured to set a number of storage areas on a display memory,
the display area selection unit includes a selection unit configured to select from among the storage areas on the display memory, based on the photographing information recorded in the memory, a storage area in which the photographed image data and associated photographing information recorded in the memory is storable,
the second display control unit includes a limiting unit configured to limit the number of photographed image data to be simultaneously stored in the storage area, and
the apparatus further comprises an image file generation unit configured to generate image file data using the photographed image data stored on the display memory by the first and second display control units and the display area selection unit.

14. The apparatus according to claim 13, wherein:
the display displays the photographed image data stored on the display memory by the first and second display control units and the display area selection unit,
the apparatus further comprises a generation instruction unit which instructs generation of the image file data by the image file generation unit, and when instruction by the generation instruction unit is issued in a state wherein the photographed image data is displayed on the display, the image file generation unit generates the image file data.

15. The apparatus according to claim 13, wherein the memory records the image file data generated by the image file generation unit.

16. The apparatus according to claim 13, further comprising a transmission unit which transmits the image file data generated by the image file generation unit to an external device.

17. The apparatus according to claim 1, further comprising:
a display area designation unit configured to designate an arbitrary display area of the given number of display areas; and
a fourth display control unit configured to simultaneously display, on the display, a plurality of photographed image data including photographed image data which are limitable by the second display control unit and are not displayed, in the arbitrary display area designated by the display area designation unit.

18. The apparatus according to claim 17, further comprising:
an image selection unit configured to select an arbitrary photographed image data from the plurality of photographed image data simultaneously displayed on the display by the fourth display control unit, and
a fifth display control unit configured to display, on the display, an enlarged image of the arbitrary photographed image data selected by the image selection unit.

19. The apparatus according to claim 1, further comprising an image sensor configured to sense an object image and output photographed image data, and wherein the memory records the photographed image data output from the image sensor.

20. An image reproduction method comprising:
a first display control step of setting a given number of display areas on a display, the display areas each being assignable to one of a plurality of different image groups;
a display area selection step of selecting from among the display areas, based on photographing information recorded in a memory, a display area to which an image group including of photographed image data recorded in the memory in association with the photographing information is assigned;
a second display control step of limiting a number of the photographed image data, from among all of the photographed image data of the image group assigned to the selected display area, to be simultaneously displayed in the selected display area to a predetermined number; and
a third display control step of first displaying in the selected display area a first set of photographed image data from among the photographed image data of the image group assigned to the selected display area, and then displaying at least one different successive set of photographed image data from among the photographed image data of the image group assigned to the selected display area, while maintaining the display control of the first and second display control steps, thereby continuously displaying, in the selected display area, all of the photographed image data of the image group assigned to the selected display area, wherein a number of the photographed image data in the first set and each successive set is limited to the predetermined number set by the second display control step.

21. A computer readable medium having recorded thereon a computer readable program for controlling an image reproduction apparatus to execute:
a first display control step of setting a given number of display areas on a display, the display areas each being assignable to one of a plurality of different image groups;
a display area selection step of selecting from among the display areas, based on photographing information recorded in a memory, a display area to which an image group of photographed image data recorded in the memory in association with the photographing information is assigned;
a second display control step of limiting a number of the photographed image data, from among all of the photographed image data of the image group assigned to the selected display area, to be simultaneously displayed in the selected display area to a predetermined number; and
a third display control step of first displaying in the selected display area a first set of photographed image data from among the photographed image data of the image group assigned to the selected display area, and then displaying at least one different successive set of photographed image data from among the photographed image data of the image group assigned to the selected display area, while maintaining the display control of the first and second display control steps, thereby continuously displaying, in the selected display area, all of the photographed image data of the image group assigned to the selected display area, wherein a number of the photographed image data in the first set and each successive set is limited to the predetermined number set by the second display control step.

* * * * *